July 26, 1938.  A. C. LIND  2,124,965
ALARM MECHANISM FOR SHEAR-PIN COUPLINGS
Filed July 7, 1937
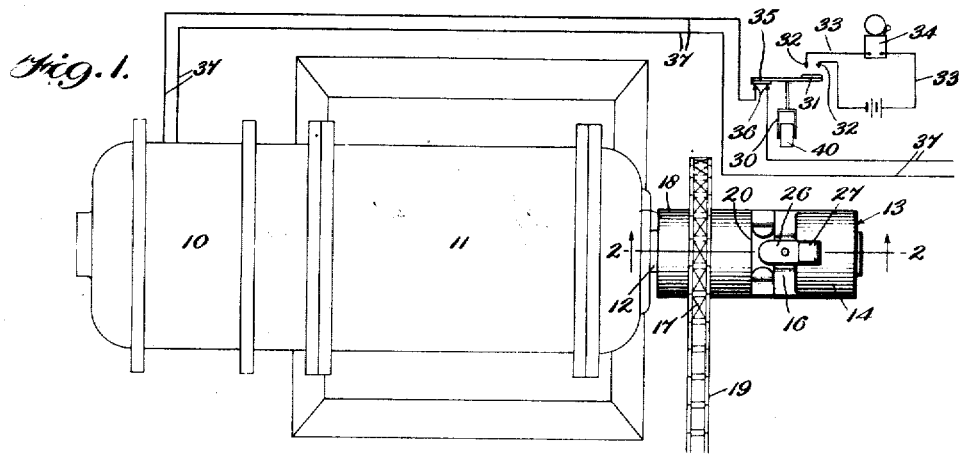
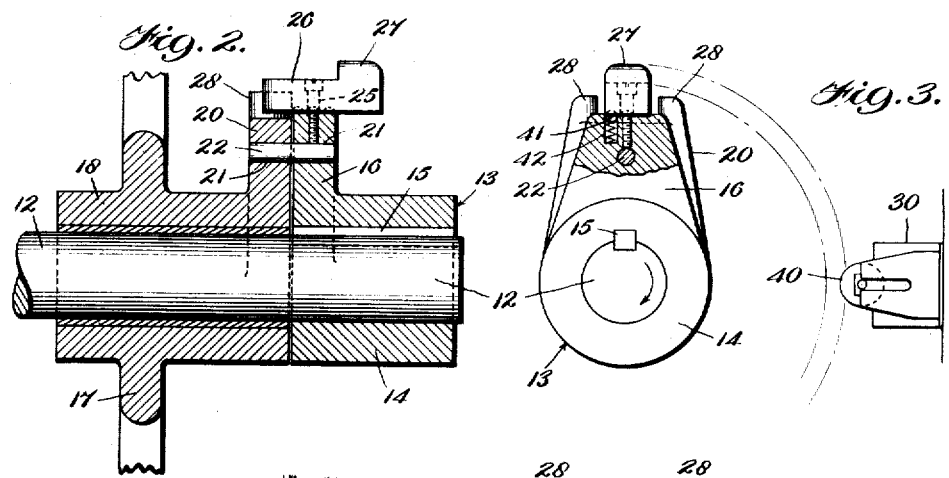
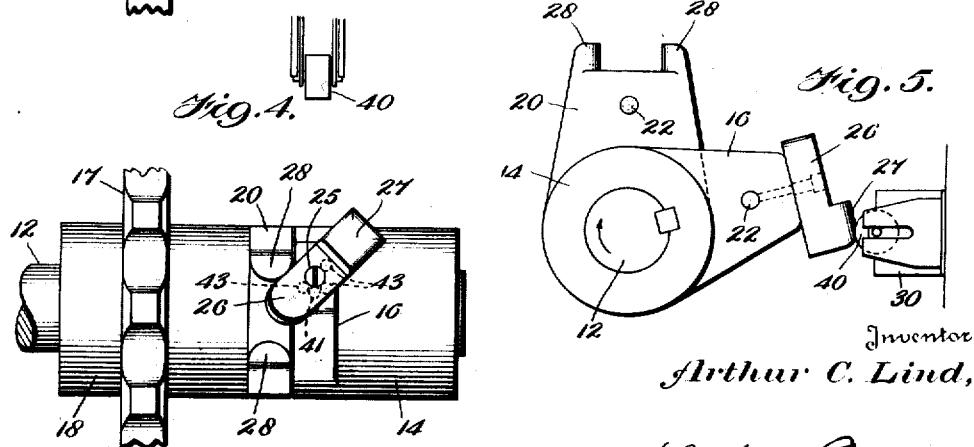
Inventor
Arthur C. Lind,
By Barker + Collings
Attorneys Patented July 26, 1938

2,124,965

UNITED STATES PATENT OFFICE 2,124,965

ALARM MECHANISM FOR SHEAR-PIN COUPLINGS

Arthur C. Lind, Milwaukee, Wis., assignor to Chain Belt Company, Milwaukee, Wis., a corporation of Wisconsin Application July 7, 1937, Serial No. 152,419

7 Claims. (Cl. 192—150)

The invention relates to alarm mechanism for shear-pin couplings such as are frequently employed in power drives to protect portions of an apparatus against overloads, and has for one of its objects to provide mechanism which will be simple in construction, comparatively inexpensive to manufacture and install, and quite efficient and reliable in operation, for giving an audible, visible or other indication upon shearing of the coupling pin under overloads which might prove detrimental to portions of the machine. If so desired, the mechanism may also be arranged to control the source of power to stop the same when shearing of the shear element takes place, thereby stopping the driving member of the coupling as well as the driven.

With the above and other objects in view which will appear as the description proceeds, the invention consists in the novel details of construction, and combinations and arrangements of parts, more fully hereinafter described and particularly pointed out in the appended claims.

Referring to the accompanying drawing forming a part of this specification, in which like reference characters designate like parts in all the views:—

Figure 1 is a plan view of a prime mover, here shown as an electric motor having associated with it a speed reducing mechanism, the driving shaft of which is provided with a shear-pin coupling device of a well known type, and which is equipped with one form of overload alarm mechanism constructed and arranged in accordance with the invention;

Fig. 2 is an enlarged vertical sectional view through the shear-pin coupling and alarm actuating device, taken approximately on the plane indicated by the line 2—2 of Fig. 1, looking in the direction of the arrows;

Fig. 3 is an end elevational view, partly broken away, of the parts shown in Fig. 2, as seen from the right of said figure;

Fig. 4 is a plan view illustrating the parts in an intermediate position assumed upon shearing of the coupling pin; and Fig. 5 is an end elevational view similar to Fig. 3, but showing the parts in their alarm-actuating positions.

Referring more particularly to the said drawing, 10 indicates a prime mover here shown as being an electric motor and having associated with it a speed reducing mechanism 11 from which extends a driving shaft 12. Upon the end of the said shaft 12 there is mounted one element 13 of a power transmission coupling, here shown as comprising a hub 14 keyed to the said shaft 12 by the key 15 and having formed on its inner end a radially extending arm 16. Between the coupling element 13 and the speed reducing mechanism 11 there is mounted a power transmission sprocket 17, the hub 18 of which is loosely journalled upon the shaft 12 and the teeth of which are engaged by a chain 19 by means of which the power is transmitted to the instrumentality being driven. The hub 18 of sprocket 17 is provided with a radially extending arm 20 normally disposed in complementary relation to the arm 16 of the coupling element 13 and the said arms are provided with complementary apertures 21 through which is passed the shear pin 22, as will be readily understood from the drawing. The arms 16 and 20 together with the shear pin 22 thus constitute the power transmission coupling mechanism which is adapted to transmit power up to the limit of the shearing strength of pin 22, and when such limit is exceeded the pin will be ruptured and the sprocket 17 and chain 19 will stop, with the drive shaft 12 and coupling element 13 continuing to rotate.

In order to carry out the principal object of the invention and to give a visible, audible, or other alarm when such shearing of pin 22 takes place, and also preferably, although not necessarily, to stop the prime mover 10, the following mechanism is provided. Upon the outer end of the arm 16 there is pivotally mounted as by the pin or stud 25, an actuating dog 26 having at one end an enlargement 27, as clearly shown in Figures 2, 4 and 5. Upon the outer end of the companion arm 20 there is formed a pair of spaced lugs 28 between which the other end of actuating dog 26 is received when the parts are in their normal positions with the shear pin intact.

Adjacent the path of travel of the arms 16 and 20, and preferably in substantial alignment with that of arm 16, there is disposed a suitable control means 30, in the present instance constituting an electric switch. As is diagrammatically illustrated in Figure 1, this mechanism is provided with a movable contact member 31 adapted in one position to bridge the stationary contacts 32 contained in the circuit 33 of an electric bell or other suitable signalling device 34. The switch mechanism may also embody a movable contact 35 adapted in one position to bridge the stationary contacts 36 which are included in the power circuit 37 of the prime mover 10, as will be readily understood. This switch 30 may be any well known commercial form of limit switch, which when moved from one position to another remains in such latter position until manually or mechanically re-set.

The parts are so constructed and arranged that when the actuating dog 26 is in the position it normally occupies when the shear pin 22 is intact, and the coupling arms 16 and 20 are rotating, the actuating head 27 of the dog will be out of alignment with the roller 40 or other actuating member of the switch mechanism 30 so that the said dog will clear the roller as the coupling rotates. In this position of the switch the contact member 35 bridges the contacts 36 in the motor circuit so that the power will be supplied to the said motor, whereas the contact member 31 has broken the alarm circuit 33. However, whenever the shear pin 22 is ruptured due to an overload, as above explained, the sprocket 17 and arm 20 will cease their rotation, whereas the arm 16 of coupling member 13 being keyed to the drive shaft will continue its rotation, and the relative movement thus occasioned between the arms 16 and 20 will cause the end of dog 26 to be engaged by one or the other of the lugs 28 on arm 20, depending upon the direction of rotation of the parts, which engagement will cause the dog to be swung about its pivot 25, as indicated in Figure 4, from its normal position substantially parallel to the rotative axis of the coupling members to a position substantially transverse to said axis, as indicated in Figure 5. This movement of the dog brings the enlarged actuating head 27 into alignment with the roller 40 of switch mechanism 30, so that as the arm 16 continues its rotation the actuating head 27 will contact the said roller, as shown in Figure 5, and move the contacts 31 and 35 of the switch mechanism to first cause said contact 35 to break the motor circuit and then to cause the contact 31 to make the alarm circuit, thereby giving an audible or visible signal to the attendant that the shear pin has been ruptured.

In order to retain the dog 26 in either its actuating or its non-actuating positions, there is preferably provided a suitable detent, here shown as comprising a spring-pressed ball 41 mounted within a recess 42 formed in the arm 16, which ball is adapted to engage any one of a series of indentations 43 formed on the under face of the dog, as will be readily understood from Figures 2, 3 and 4.

While in the above disclosure the switch mechanism has been illustrated and described as controlling both an alarm circuit and the motor circuit, it is quite obvious that in special instances, if desired, either one of these circuits may be omitted leaving the switch mechanism to control only one or the other remaining circuit without departing from the spirit of the invention.

It is also obvious that although the invention has, for purposes of disclosure, been illustrated in connection with a prime mover of the electric type, that it is equally applicable to prime movers of the fluid or fluid pressure type, in which case, of course, the switch mechanism 30 could be replaced by a suitable valve for controlling the admission of fluid to the prime mover and to a whistle or other fluid pressure signal.

It is therefore obvious that the invention is not limited to the precise details of construction and arrangements of parts above described, and it is not wished to be limited to the above disclosure except as pointed out in the claims.

What is claimed is:

1. In mechanism of the class described, a power transmitting coupling including driving and driven elements and a shear pin normally connecting said elements; a control means adjacent said coupling; an actuating member for said control means movably carried by said driving element independently of the shear pin, having a portion arranged to be moved to and from a position in which it may coact with said control means; and means carried by said driven element arranged through relative movement between said elements upon rupture of the shear pin to move said actuating member to actuating position.

2. In mechanism of the class described, a power transmitting coupling including driving and driven elements and a shear pin normally connecting said elements; a control means adjacent said coupling; a member movably carried by said driving element independently of the shear pin having a portion adapted to engage with and actuate said control means, said portion however being disposed in a non-actuating position when said shear pin is intact; and means carried by said driven element arranged to move the actuating portion of said member to an actuating position relative to said control means when the shear pin ruptures.

3. In mechanism of the class described, a power transmitting coupling including driving and driven elements and a shear pin normally connecting said elements; a control means adjacent said coupling; a member pivotally carried by said driving element having a portion adapted to engage with and actuate said control means, said portion however being disposed out of line with said means when said shear pin is intact; and means carried by said driven element arranged to swing the actuating portion of said member into line with said control means when the shear pin ruptures.

4. In mechanism of the class described, a rotatable power transmitting coupling including driving and driven arms and a shear pin normally connecting said arms; a stationary control means disposed adjacent the path of travel of said arms; and a member pivotally mounted on the end of said driving arm, having a portion adapted to engage with and actuate said control means, said portion however being disposed out of line with said means when the shear pin is intact; a portion of said driven arm being arranged to engage with said member and swing its actuating portion into line with said control means upon rupture of the shear pin.

5. In mechanism of the class described, a rotatable power transmitting coupling including complementary driving and driven arms and a shear pin normally connecting said arms; a stationary control means disposed adjacent the path of travel of said arms; a member pivotally mounted on the end of said driving arm having a portion adapted to engage with and actuate said control means, said portion being disposed out of line with said means when the shear pin is intact; and an abutment on said driven arm arranged through relative movement between the arms when the shear pin ruptures to engage said actuating member and swing its actuating portion into line with said control means.

6. In mechanism of the class described, a rotatable power transmitting coupling including adjacent driving and driven arms and a shear pin normally connecting said arms; a stationary control means disposed adjacent the path of travel of said arms; spaced abutments carried by said driven arm; and an elongated member pivotally carried by said driving arm having an end portion adapted to engage with and actuate said control means, said member being disposed substantially parallel with the axis of rotation of the coupling when the shear pin is intact with its said actuating end portion out of line with said control means and its other end positioned between said abutments of the driven arm; said abutments being adapted upon relative movement between the arms upon rupture of the shear pin to swing said actuating member to a position to bring its actuating end into line with said control means.

7. In mechanism of the class described, a rotatable power transmitting coupling including adjacent driving and driven arms and a shear pin normally connecting said arms; a stationary control means disposed outside the path of travel of said arms; spaced lugs formed on the outer end of said driven arm; an elongated dog pivotally mounted on the outer end of said driving arm, having an enlarged end adapted to engage with and actuate said control means, said dog being disposed substantially parallel to the axis of rotation of said coupling when the shear pin is intact with its enlarged end out of line with said control means and its other end positioned between the lugs on said driven arm, which are adapted upon relative movement between said arms upon rupture of the shear pin to swing said dog to a position substantially transverse of the axis of rotation of the coupling and thereby bring its enlarged head into line with said control means; and a detent for retaining the dog in either of its positions.

ARTHUR C. LIND.

DISCLAIMER 2,124,965.—*Arthur C. Lind*, Milwaukee, Wis. ALARM MECHANISM FOR SHEAR-PIN COUPLINGS. Patent dated July 26, 1938. Disclaimer filed August 21, 1939, by the assignee, *Chain Belt Company.*

Hereby enters this disclaimer to claims 1, 2, 3, 4, and 5 in said specification.

[*Official Gazette September 12, 1939.*]

said control means, said member being disposed substantially parallel with the axis of rotation of the coupling when the shear pin is intact with its said actuating end portion out of line with said control means and its other end positioned between said abutments of the driven arm; said abutments being adapted upon relative movement between the arms upon rupture of the shear pin to swing said actuating member to a position to bring its actuating end into line with said control means.

7. In mechanism of the class described, a rotatable power transmitting coupling including adjacent driving and driven arms and a shear pin normally connecting said arms; a stationary control means disposed outside the path of travel of said arms; spaced lugs formed on the outer end of said driven arm; an elongated dog pivotally mounted on the outer end of said driving arm, having an enlarged end adapted to engage with and actuate said control means, said dog being disposed substantially parallel to the axis of rotation of said coupling when the shear pin is intact with its enlarged end out of line with said control means and its other end positioned between the lugs on said driven arm, which are adapted upon relative movement between said arms upon rupture of the shear pin to swing said dog to a position substantially transverse of the axis of rotation of the coupling and thereby bring its enlarged head into line with said control means; and a detent for retaining the dog in either of its positions.

ARTHUR C. LIND.

DISCLAIMER 2,124,965.—*Arthur C. Lind*, Milwaukee, Wis. ALARM MECHANISM FOR SHEAR-PIN COUPLINGS. Patent dated July 26, 1938. Disclaimer filed August 21, 1939, by the assignee, *Chain Belt Company*.

Hereby enters this disclaimer to claims 1, 2, 3, 4, and 5 in said specification.

[*Official Gazette September 12, 1939.*]